US005732287A

United States Patent [19]

Morse

[11] Patent Number: 5,732,287

[45] Date of Patent: Mar. 24, 1998

[54] METHOD, APPARATUS AND SYSTEM FOR CLEANING PRESSURE APPLYING MEMBERS

[75] Inventor: John B. Morse, Boston, Mass.

[73] Assignee: Polaroid Corporation, Cambridge, Mass.

[21] Appl. No.: 824,749

[22] Filed: Mar. 26, 1997

Related U.S. Application Data

[62] Division of Ser. No. 477,222, Jun. 7, 1995, Pat. No. 5,639, 302.

[51] Int. Cl.[6] ........ G03B 17/50

[52] U.S. Cl. ........ 396/33; 396/583

[58] Field of Search ........ 396/30–33, 36, 396/42, 583

[56] References Cited

U.S. PATENT DOCUMENTS

| | | | |
|---|---|---|---|
| 2,659,673 | 11/1953 | Rogers et al. | 430/207 |
| 3,874,875 | 4/1975 | Land | 396/583 |
| 4,019,194 | 4/1977 | Cutler, Jr. et al. | 396/30 |
| 4,183,651 | 1/1980 | Mills | 396/583 |
| 4,298,267 | 11/1981 | Friedman | 396/33 |
| 4,443,530 | 4/1984 | Cronin et al. | 396/583 |
| 4,873,167 | 10/1989 | Asano | 430/138 |
| 5,218,391 | 6/1993 | Kanai et al. | 396/40 |

FOREIGN PATENT DOCUMENTS

| | | | |
|---|---|---|---|
| 6-214306 | 8/1994 | Japan | 396/922 |

*Primary Examiner*—D. Rutledge
*Attorney, Agent, or Firm*—Leslie Payne

[57] ABSTRACT

There are provided a method, system, and apparatus for automatically cleaning a spread roller system for use in a photographic apparatus of the self-developing type. A cleaning apparatus includes a pod of cleaning fluid rupturable as it passes through a nip of a pair of spread rollers. The cleaning apparatus includes at least an opening which distributes the cleaning fluid over the rollers following pod rupture as the apparatus passes through the nip. Such an apparatus can be included in a film assemblage which comprises a film cassette housing a stack of film units of the self-developable type, wherein the cleaning apparatus is at the top of the stack and is opaque so as to also serve as a dark slide.

3 Claims, 5 Drawing Sheets

METHOD, APPARATUS AND SYSTEM FOR CLEANING PRESSURE APPLYING MEMBERS

This is a divisional of application Ser. No. 08/477,222 filed Jun. 7, 1995, now U.S. Pat. No. 5,639,302.

BACKGROUND OF THE INVENTION

The present invention relates generally to method, apparatus and system for cleaning a pressure applying assembly and, in particular, method, apparatus and system for automatically cleaning a spread roller assembly of a photographic apparatus of the self-developing type.

In the field of instant photography, it is known to develop a latent image in self-developing film units by applying and spreading a processing fluid to and between a pair of film unit sheets. Typically in this regard, each film unit is formed with a rupturable pod or reservoir of processing fluid adjacent its leading edge. A plurality of such film units is housed in a film cassette that is mountable in a self-developing photographic apparatus. Following exposure of the unit through an exposure aperture in the film cassette, the unit's leading edge is ejected therefrom by a film unit advancing mechanism. Thereafter, a pair of motorized spread rollers act to rupture and spread the processing fluid as they advance the unit from the cassette through an exit slot of the camera. The film units are constructed to avoid leakage of the processing fluid when subjected to compressive pressures of the spread rollers. In practice however, there are occasions in which the processing fluid leaks onto the spread rollers and the latter must be cleaned. The conventional cleaning methods include applying a solvent and manually wiping the rollers. While such approaches are successful, there is nevertheless a continuing desire to expedite the cleaning process in an automatic manner. Heretofore, none of the known prior art has methods, systems, and apparatus for automatically cleaning spread rollers of the type used in a photographic apparatus of the self-developing type.

SUMMARY OF THE INVENTION

According to the present invention there are provided improved method, apparatus, and system for cleaning a pressure applying assembly. In this regard, there is provided an apparatus for automatically cleaning a spread roller assembly. The cleaning apparatus comprises a body portion; a reservoir of cleaning fluid connected to the body portion which reservoir is rupturable by passing through the pressure applying assembly. The body portion includes means for distributing the cleaning fluid from the ruptured reservoir onto the spread rollers as they advance the cleaning apparatus.

In an illustrated embodiment there is provided a plurality of fluid discharge openings formed along a longitudinal extent of the body portion for distributing the discharged cleaning fluid along the longitudinal extent of the body portion.

In another illustrated embodiment, the distributing means includes a roller stop formed adjacent a trailing edge of the body portion.

In another illustrated embodiment, the cleaning apparatus includes a pair of juxtaposed and spaced apart fluid impervious membranes. Each one of which has at least a discharge opening therein for allowing the cleaning fluid to pass therethrough from the reservoir; and, a pair of spaced apart fluid absorbing and porous sheet portions sandwiching the pair of membranes therebetween, whereby the sheets convey the cleaning fluid to the spread roller assembly.

In another illustrated embodiment, the cleaning apparatus includes a fluid reservoir and roller stop being located adjacent a trailing edge of the cleaning apparatus and a pair of spaced porous sheet portions which cover the reservoir and stop, whereby the pressure applying rollers rupture the reservoir such that the sheets become wet and the stop induces the rollers to skid over the wetted sheets, such that the rollers become wetted and wiped.

In another illustrated embodiment, an opaque sheet acts as a body portion or platform for the reservoir and the stop and the porous sheets.

In still another embodiment, the stop and the reservoir can be peeled from the body portion.

In another illustrated embodiment, provision is made for a method of automatically cleaning a pair of pressure applying rollers comprising the steps of: providing a cleaning apparatus for cleaning the pair of pressure applying rollers wherein the apparatus includes a body portion having at least a reservoir of cleaning fluid coupled thereto which is rupturable; and the body portion includes means for distributing the cleaning fluid from the ruptured reservoir to the pair of pressure applying members as the cleaning apparatus advances through a nip defined thereby; and, operating a roller assembly so as to advance the cleaning apparatus through a nip defined thereby for rupturing the reservoir and distributing the fluid on the pressure applying rollers.

In still another embodiment, provision is made for a cassette mountable in the photographic apparatus wherein the cassette includes a cleaning apparatus which is ejectable therefrom; the cleaning apparatus comprises a body portion; a reservoir of cleaning fluid connected to the body portion which reservoir is rupturable by passing through a spread roller assembly. The body portion includes means for distributing the cleaning fluid from the ruptured reservoir onto the spread rollers as the rollers advance the cleaning apparatus. The cassette is constructed to allow the cleaning apparatus to be ejected therefrom when in the photographic apparatus for cleaning the spread rollers.

In still another illustrated embodiment, the cassette of the last noted type includes a stack of self-developing film units which are ejectable from the cassette and which are advanced from the cassette by the pressure applying means. In such an embodiment, the cleaning apparatus defines a dark slide of the film cassette.

The above and further objects of the invention include the provisions of: an improved cleaning apparatus for use in automatically cleaning a pair of pressure applying members; an improved cleaning apparatus which releases cleaning fluid upon the application of pressure thereto; an improved cleaning apparatus which absorbs the cleaning fluid from the pressure applying members following release of the cleaning fluid; an improved cleaning apparatus which has its apertures arranged to distribute the flow of cleaning fluid; an improved cleaning apparatus usable in a cassette compatible in a photographic apparatus of the self-developing type; an improved cleaning apparatus of the above noted type in which the cassette in addition to holding the cleaning apparatus also holds a stack of film units of the self-developing type; an improved cleaning apparatus of the last noted type in which the cleaning apparatus functions as a dark slide; and, an improved method of automatically cleaning a pair of spread rollers used in a self-developing photographic apparatus.

The above and other objects and further scope of applicability of the present invention will become apparent when reading a detailed description thereof when taken in conjunction with the accompanying drawings in which like parts throughout the several drawings are indicated by like reference numerals.

DETAILED DESCRIPTION

Figure 1:
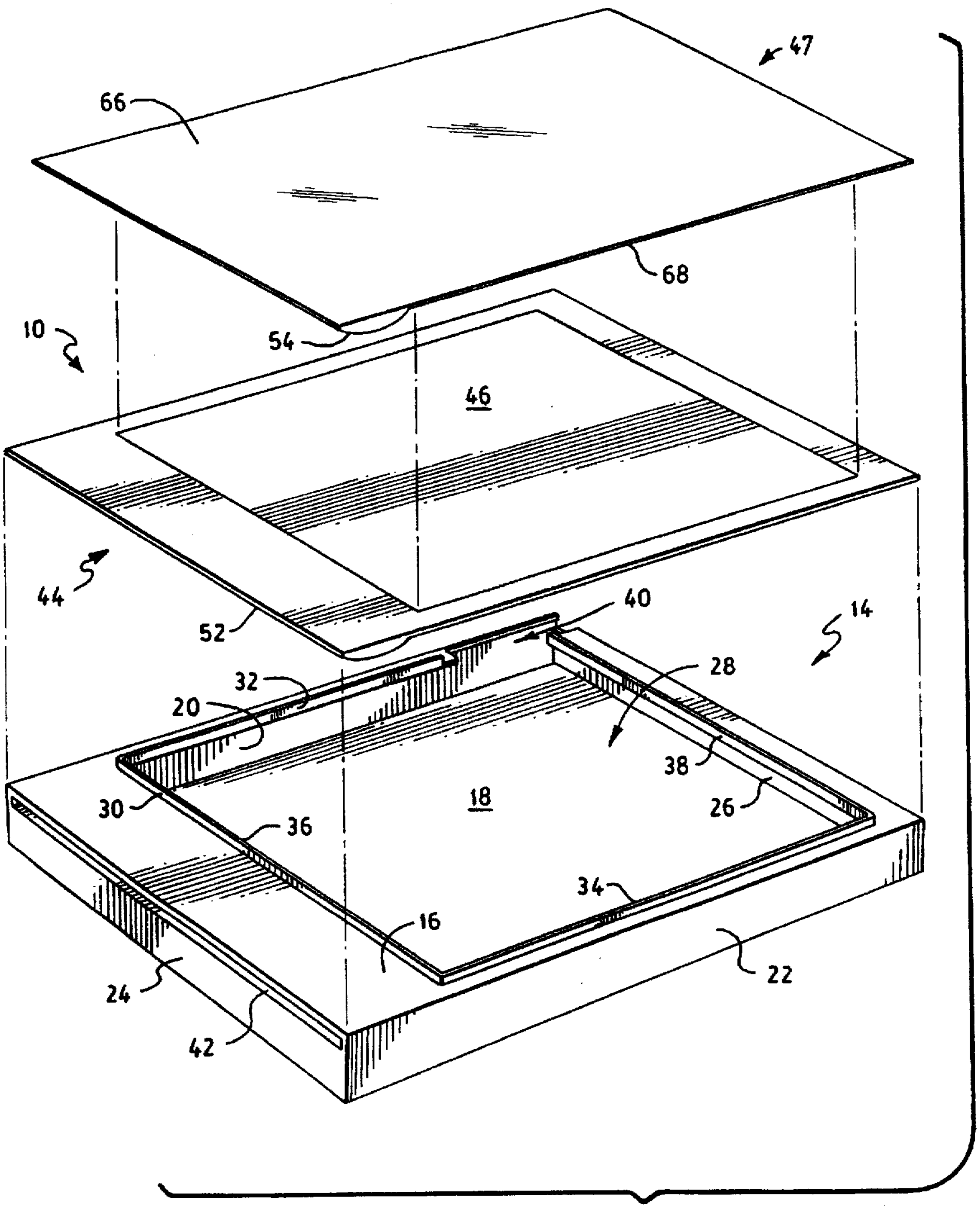
FIG. 1 is an exploded perspective view of a photographic film assemblage illustrating a cleaning apparatus and a film unit separated from the film cassette.
Figure 2:
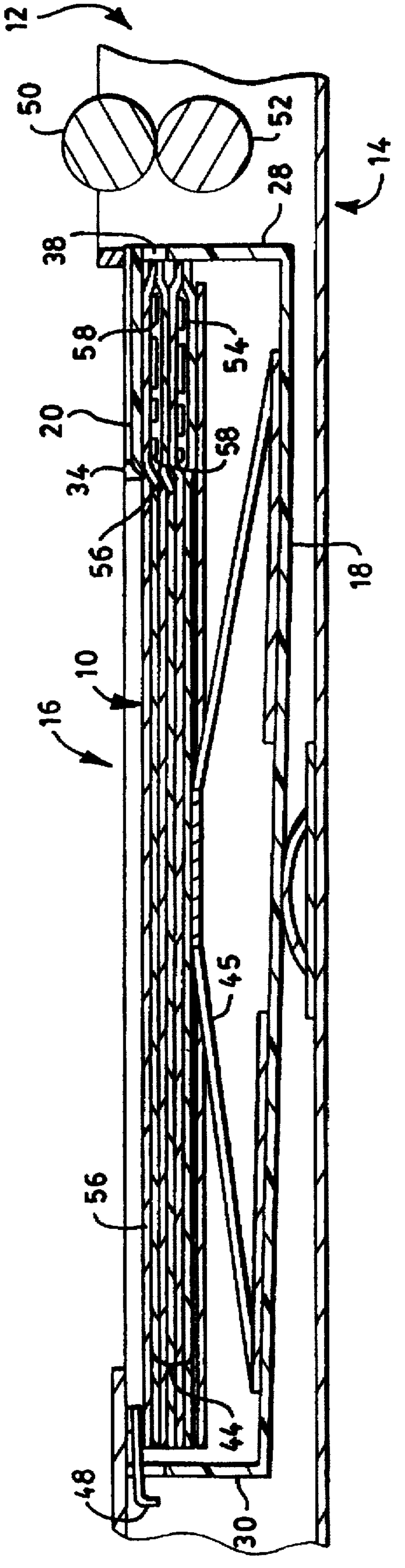
FIG. 2 is a fragmentary sectional view, in elevation, of a film cassette within a camera containing the cleaning apparatus.

Reference is made to FIGS. 1–4 for illustrating one preferred embodiment of a cleaning apparatus 10 usable for cleaning automatically a pressure applying mechanism, such as a spread roller assembly 12 of the type found in a photographic camera apparatus 14 of the self-developing type. Although the present embodiment discloses use of the invention in a camera apparatus, it will be appreciated that in can be used in other types of photographic systems which process film units of the serf-developing type, such as for example the system described in commonly assigned U.S. Pat. No. 4,183,651.

A photographic film assemblage 16 is mountable within the photographic camera apparatus 14. Included in the assemblage 16 is a parallelepiped and opaque film cassette 18 having spaced apart top and bottom walls 20 and 22, a pair of laterally spaced side walls 24 and 26, and longitudinally spaced leading and trading end walls 28 and 30; respectively. The top wall 20 includes an exposure window 32 defined, in part, by an upstanding integral rib 34 and an elongate opening 36 (FIG. 1) that extends along a portion of the side wall 24. The leading end wall 28 cooperates with an edge of the top wall 20 to define a film exit slot or opening 38.

Supported within the cassette 18 is a stack of individual film units 44, preferably of the instant or serf-developing type and a spring platen 45 for supporting and urging the stack toward the top wall 20, such that an uppermost film unit 44 in the stack may be located in engagement with the interior surface of the top wall 20. A photosensitive area 46 of the thus positioned topmost film unit 44 in alignment with the exposure window 32. In self-developing photographic assemblages, there is provided a dark slide that is located between the uppermost film unit 44 in the cassette and the interior surface of the top wall 20. The dark slide prevents unintended film exposure during loading of the cassette into the camera. In this preferred embodiment, the cleaning apparatus 10, as will be described, serves as the dark slide of the film assemblage although it need not be.

Following cassette loading, a camera mounted film advancing means, such as a pick 48 (FIG. 2) is actuated to enter the cassette 18 through the opening 36 and engage a trailing edge of the cleaning apparatus 10. As a consequence thereof, the cleaning apparatus' leading edge emerges from the slot 38 and enters a pressure applying nip defined by a pair of spread rollers 50, 52 of the spread roller assembly 12. The spread rollers 50, 52 are operated to rotate and advance the cleaning apparatus 10 from the cassette 18 for purposes which will be described.

With the dark slide removed, the uppermost film unit 44 is urged upwardly by the spring platen 45 into engagement with the top wall 20 for its exposure. Subsequent to such exposure, the aforementioned film advancing pick 48 is again actuated to move into engagement with a trailing edge of the topmost film unit 44 so as to move the latter partially out of the cassette 18 through the slot 38 and into the nip of the spread rollers 50, 52. As is well known in the art, the rollers 50, 52 continue the advancement of the exposed film unit 44 from the cassette. In the process, it ruptures a container or pod 54 of processing liquid and spreads the liquid between predetermined layers of the film unit 44 to initiate the formation of a visible image.

During rupturing of a film unit's pod there may be an occasional leakage of the developer liquid from the designated area for film development onto the surfaces of rollers 50, 52 so that a cleaning of the rollers is required at some time subsequent. As noted earlier, this invention provides a cleaning apparatus 10 which is illustrated as the top unit in FIGS. 1 and 2. In this preferred embodiment, the cleaning apparatus 10, it is defined as a generally planar and rectangular cleaning member having a configuration which is generally coextensive with that of the film units in the stack. A leading edge of cleaning member 56 includes a pod 58 of a cleaning liquid 60 which extends transversely along such an edge and is adapted to be ruptured by passing through a nip defined by the pressure applying rollers 50, 52 when it is discharged by the pick 48. The pod 58 is structured to discharge its contents into a pocket 62 formed by and between a pair of light and liquid impervious membranes 64, 66. The pocket 62 is formed by a bonding of membranes 64, 66 along three edges 68, 70, 72. Any conventional flexible resin film may be used as the impermeable membrane so long as it does not have an adverse reaction to the cleaning liquid 60. It is preferred that the cleaning liquid be water, rubbing alcohol, ethyl alcohol, mixtures thereof, and the like. Other solutions that are useful for cleaning the processing rollers can be employed.

The membranes 64 and 66 are sandwiched between a paw of liquid absorbing sheets 74, 76 which cover slots or apertures 78, 80 in the membranes 64, 66; respectively. The slots 78, 80 form passageways from the pocket 62 to the sheets 74, 76. The slots 78, 80 allow the liquid in the pocket 62, from the ruptured pod 58, to pass and to contact the liquid absorbing sheets 74, 76 whereupon they contact directly the pressure applying rollers. As a consequence, the wetted sheets can apply the cleaning fluid to the rollers. Another advantage is that slots 78, 80 are transversely offset, such that a beam of light will not pass through the cleaning member. The offset slots in light impermeable plastic membranes 64, 66 allow the cleaning member 56 to serve as a dark slide if it is desired.

Figure 3:
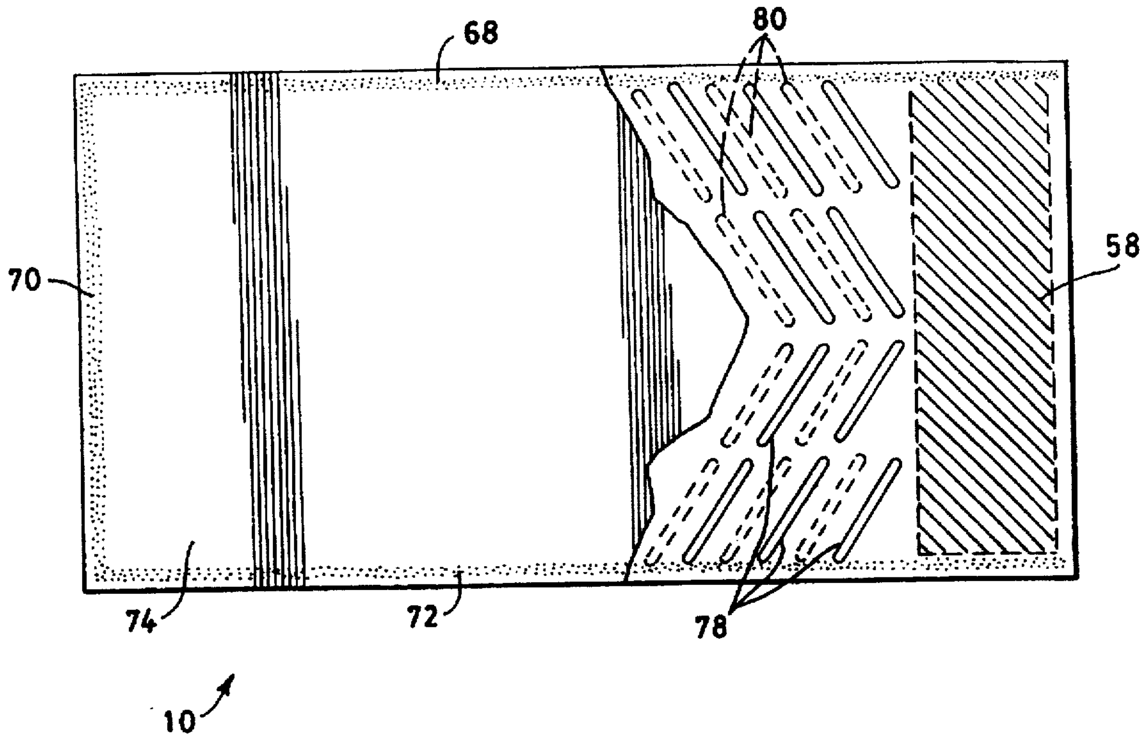
FIG. 3 is a top plan view of the cleaning apparatus illustrating a portion of a top sheet thereof being partly removed.
Figure 4:
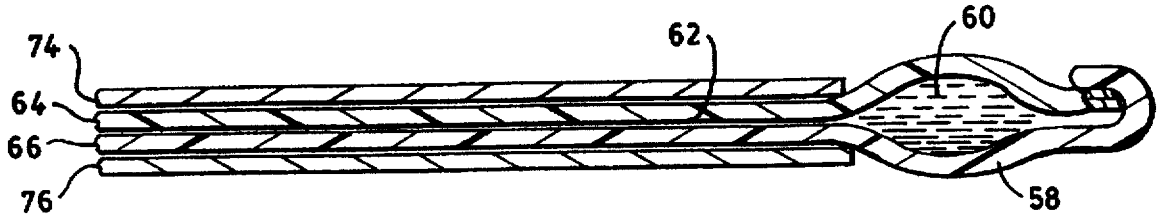
FIG. 4 is a fragmented sectional view of the cleaning frame of FIG. 3.

It will be observed in FIG. 3, that the slots 78, 80 are formed in a herringbone pattern diverging toward the outer edges of the pocket from a centerline bisecting the pod 58 and the remainder of cleaning member 56. The slots serve to distribute the cleaning liquid uniformly across the surface of liquid absorbing sheets 74, 76. This is accomplished best by the pattern shown because the rupturing of pod 58 tends to direct the water to the center of the pocket 62 and the herringbone pattern slots assist in sideboard distribution for a more uniform wetting of sheets 74, 76. It will be understood that other patterns can be used, but the herringbone pattern is effective.

Referring back to the liquid absorbing porous sheets 74, 76, they may be formed of a suitable absorbent material, such as non-woven fibers constructed as a mat, paper sheets similar to paper towels, and woven absorbent fabric. Whatever material is selected however, it will be appreciated that the absorbent sheets will distribute the cleaning fluid onto the rollers. After having described the above-entitled embodiment, its operation is believed to be self-evident. To supplement, such description the following operation is set forth.

In operation the cassette 18 is loaded into the camera 12. As noted, the cleaning member 56 is the uppermost unit in the cassette and functions as a dark slide for the cassette. Upon actuation of the camera, the pick 48 is operated to engage the trailing edge of the cleaning member and urges it through film exit opening 38 into the nip of spread rollers 50, 52. The spread rollers 50, 52 are operated to apply compressive pressures progressively along the length of each film unit and the cleaning apparatus as they exit. As a result, the pod 58 of cleaning fluid 60 carried by a leading edge of the cleaning apparatus 10 is ruptured. Since the pod 54 is ruptured by the spread rollers, the cleaning liquid is discharged into the pocket 62 formed by the liquid impervious membranes 64, 66. The liquid 60 escapes from the pocket 62 through apertures 78, 80 at both the upper and lower sides of the membranes 64, 66 where it is absorbed by the overlying liquid absorbing sheets 74, 76. The liquid absorbing sheets in turn apply moisture to the rotating surfaces of rollers 50, 52. As a consequence, any developer liquid which may have dried on the rollers is reliquified. The liquid is continuously and automatically applied as the rollers pull the cleaning member 56 forward until the cleaning apparatus exits the cassette.

For wiping the moistened rollers, the volume of cleaning liquid 60 in pod 58 is preselected, such that it is of a smaller volume than may be easily absorbed by the two liquid absorbing sheets 74, 76. As a consequence, when the cleaning member 50 advances through the rollers, the liquid absorbing sheets 74, 76 become less and less moist until the trailing ends are essentially dry. As a result, the trailing ends of the liquid absorbing sheets serve to dry the surfaces on rollers 50, 52 and carry the re-liquefied developer liquid from the rollers in the camera as the cleaning flame/dark slide is discharged to the exterior of the camera. It will be noted that slots 78, 80 are of a length less than about one-half the width of the impervious membranes and they diverge at an angle both downstream and toward the sealed edges of the membranes. This serves to more uniformly distribute the cleaning liquid onto the porous liquid absorbing sheets 74, 76.

The illustrated embodiment shows the cleaning member 50 as the uppermost or dark slide unit in the film cassette. However, the cleaning member could be in a portion of the cassette such as the lowermost unit in the film cassette. Thus, the rollers 50, 52 would be cleaned by the cleaning member after all the film units have been processed. Another alternative is to have cleaning members mounted individually in a cassette which would allow the photographer to remove a partially used cassette of film units and insert the cassette holding the cleaning members. Accordingly, should the photographer become aware of a problem of inadvertent discharge of developer liquid onto the spread rollers, the photographer could immediately stop the photographic session and clean the rollers by reinserting the cleaning cassette.

Figure 5:
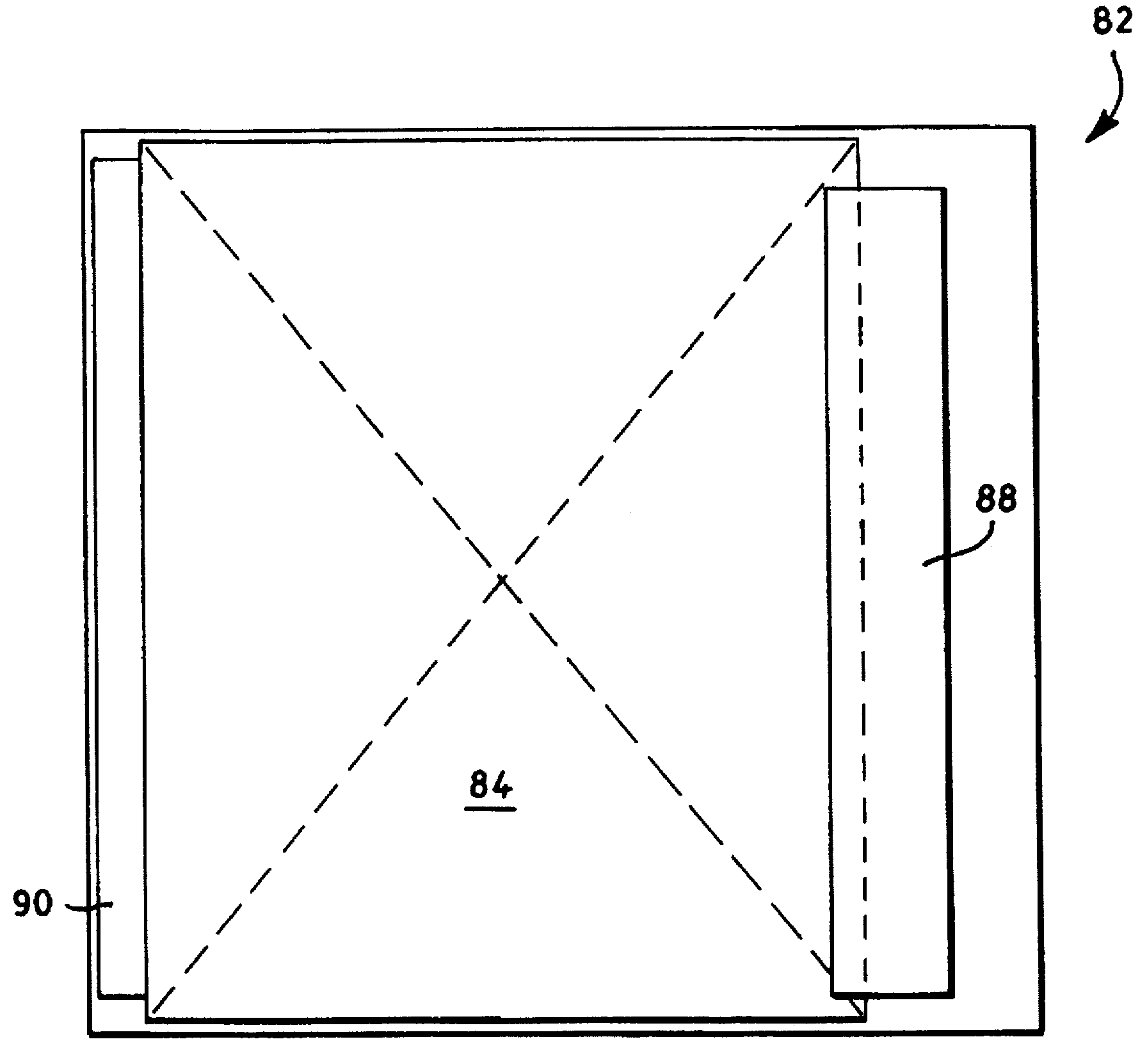
FIG. 5 is a fragmented top plan schematic view of a second preferred embodiment of the present invention.
Figure 6:
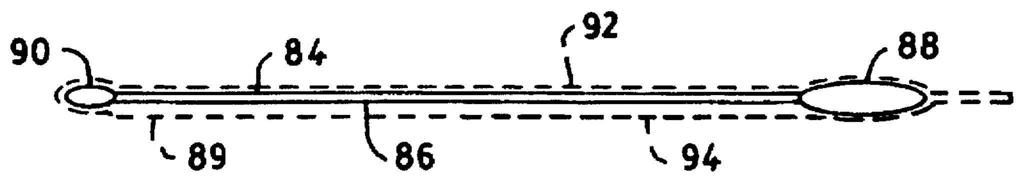
FIG. 6 is a schematic side elevational view of the embodiment depicted in FIG. 5; and, FIG. 7 is a schematic illustration of a third illustrated embodiment of the present invention.

Reference is made to FIGS. 5 and 6 for illustrating another preferred cleaning apparatus of the present invention. In particular, there is provided a cleaning member 82 which is constructed as a thin rectangular member that is generally coextensive to the dimensions of the film units in the cassette. In this embodiment, the cleaning member 82 includes a pair of spaced apart fluid impervious membranes 84, 86 which may be a pair of opaque plastic sheets, a pod 88 of cleaning fluid at a leading edge of the sheets and a roller stop 90 at a trailing end thereof. The roller stop 90 can be made of absorbent or non-absorbent materials. In this embodiment, the roller stop is made of an absorbent material, such a paper which permits the cleaning fluid flowing from the pod 88 and through a pocket or cavity 89 defined between the membranes 84, 86 to the absorbent roller stop 90. The pocket or cavity assist in transporting the fluid from the stop 90 extends transversely along the edge and acts to delay and control the distribution of the cleaning fluid 60 until the trailing edge thereof is immediately adjacent the spread rollers (not shown). In this connection, the absorbent covers 92, 94 overlying the membranes 84, 86 are made at an end near the stop upon the pod 88 being ruptured as the cleaning member passes through the pressure applying rollers. In this embodiment, the absorbent covers are relatively thin and made of paper; for example the paper can have a thickness on the order of about 0.003 inch. Thus, the pressure applying rollers rolls over the moistened covers until engaging the stop 90. The fluid from the absorbent roller stop 90 moistens the absorbent covers 92, 94 after the cleaning fluid exits the pod. Significantly, this skidding action effects a wiping action of the spread rollers of the remoistened processing fluid. When the customer removes the cleaning member, it will be dry to the touch except for a slightly damp trailing area. Also, the paper covers can still offer area which can be used for advertising purposes, such as the present dark slides do. It will be appreciated that the present invention envisions the pod being at other than the leading end of the cleaning member. For instance, the pod can be located closer to the stop.

Figure 7:
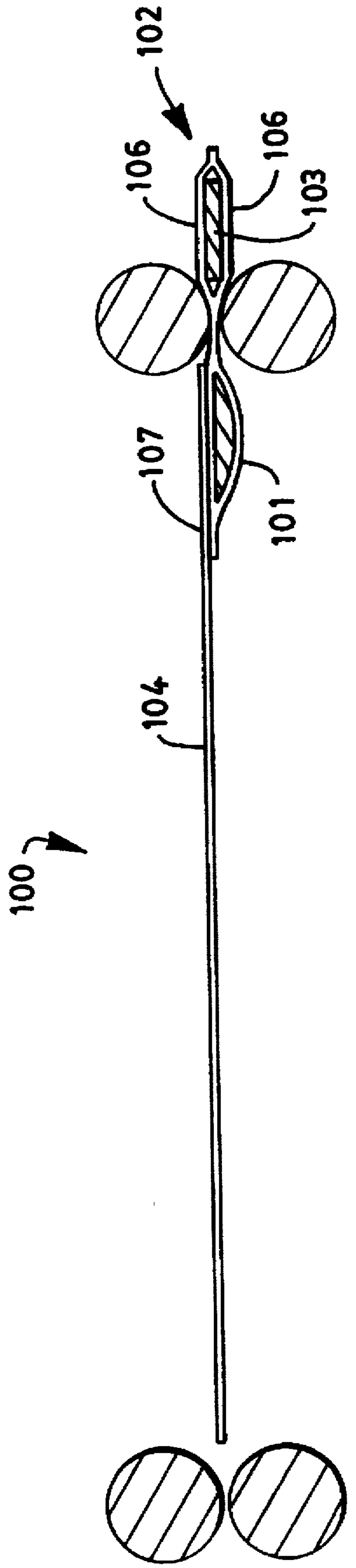

In this regard, reference is made to FIG. 7 for schematically illustrating yet another embodiment of a cleaning member 100 made in connection with the present invention. In this embodiment, the cleaning member 100 includes a rupturable pod 101 and roll stop 102 combination, wherein each is generally elongated and transversely mounted on and relative a top surface of a body portion 104. An absorbent covering, such as paper sheets 106 as described in the last embodiment, encase the pod, and stop. In this embodiment, the paper covered pod 101 can be releasably secured to the body portion 104 by a layer 107 of adhesive material. Of course, the present invention envisions a variety of adhesive techniques for releasably holding the pod and stop to the body portion. Both the pod 101 and roll stop 102 are, preferably, situated adjacent a trailing edge of the body portion 104. In this embodiment, the body portion 104 can be a generally thin and rectangular member which is coextensive to the film units that are contained in a film cassette. In this embodiment, the body portion can be made of a material, such as cardboard which is rigid enough to be picked by the camera's picking mechanism and opaque. Referring back to the pod 100, it contains a cleaning fluid, such as described above and is situated adjacent to and slightly spaced from a leading edge of the stop 102. Because the pod is situated adjacent the trailing edge, it need not contain as much fluid as in the earlier described embodiments. In this embodiment, the spread rollers are adapted to skid on the moistened paper covering 106 in the relief area between the slightly spaced pod and the stop 102 after the pod has burst by passing through the rollers. In this regard the cleaning fluid flows through capillary action to the paper covering 106 and wets the latter. In this embodiment, the stop 102 need not be made of an absorbent material but can be made of a thin, non-absorbent polyester strip 103 which has a generally rectangular configuration and can have a variety of widths. The thicknesses of the polyester stop can vary such that its thickness alone or the combined thicknesses of it in combination with the thickness of the paper covering is sufficient to induce the desired skidding action of the rollers on the wetted paper in the relief area immediately in front of the roll stop 102. For example, a thickness of the polyester in the order of about 0.025 inch in combination with the thicknesses of both paper layers of about 0.006 inch will yield a stop thickness of about 0.030 inch which exceeds the pregap of the rollers. As in the other described embodiments, the stop has a configuration with a tapered configuration adjacent the trailing edge to allow for mechanical picking thereof. The effective slope of the leading edge of the bump created by the stop 102 is greater than the coefficient of friction of the paper covering 106. Whatever the materials selected for the stop however, it will be appreciated that the stop should be constructed thick enough so that the noted skidding action can be accomplished. The stop in effects acts as a temporary stop on the further advancement of the cleaning member and assists in the skidding action. In this manner, the spread rollers can skid on the wet paper covering. Such skidding, in effect, serves to both wet and wipe and, thus clean the spread rollers. After the skidding, an operator of the camera can manually remove the cleaning member by pulling it through the spread rollers. Of course, the cardboard can be, if desired, printed with indicia. While this embodiment has described the cardboard as being opaque, such need not be the case. In addition, the present invention envisions that both the pod and its associated roll stop can be peeled from the cardboard body portion.

In the foregoing description of the present invention, there is provided a cleaning apparatus which may be mounted in a conventional film cassette to clean the surfaces of a pair of spread rollers within a camera. The cleaning apparatus may be a single unit within a special cassette, or at least a unit of a film assemblage including a plurality of film units of the self-developing type mounted within a filled film cassette with all of the film units fitting above the cleaning frame.

What is claimed is:

1. A method of automatically cleaning a pair of pressure applying rollers comprising the steps of: providing an apparatus for cleaning the pair of rollers wherein the apparatus comprises a body portion having at least one reservoir of cleaning fluid coupled thereto which is rupturable; and providing the body portion with means for distributing the cleaning fluid from a ruptured reservoir to the pair of rollers as the rollers advance the cleaning apparatus through a nip defined thereby; advancing the cleaning apparatus to the nip; and, operating a roller assembly so it advances the cleaning apparatus between the nip so as to rupture the reservoir, and distribute the fluid from the reservoir to the rollers.

2. A method of cleaning at least one pair of spread rollers in a photographic apparatus comprising the steps of:

locating a film cassette in an apparatus wherein the film cassette includes an exit slot which allows the ejection of individual film units of the self-developing type and which contains a cleaning assembly which can be ejected from the exit slot;

providing at least a pair of spread rollers for applying pressure to each of the exiting film units and to the cleaning assembly; and applying the cleaning fluid on a portion of the spread roller pair by rupturing a reservoir containing the cleaning fluid by passing the cleaning assembly from the exit slot and through a nip defined by the pair of pressure applying rollers for spreading the fluid over an axial extent of the pair of spread rollers.

3. The method of claim 2 further comprising the step of:

passing an absorbent material through the nip so as to absorb the cleaning fluid on the spread roller pair, wherein the absorbent material is an integral portion of the cleaning assembly.

* * * * *